United States Patent [19]

Parrott

[11] Patent Number: 4,720,472

[45] Date of Patent: Jan. 19, 1988

[54] HYDROCRACKING CATALYST FOR MIDDLE DISTILLATES

[75] Inventor: Stephen L. Parrott, Bartlesville, Okla.

[73] Assignee: Phillips Petroleum Company, Bartlesville, Okla.

[21] Appl. No.: 763,592

[22] Filed: Aug. 8, 1985

[51] Int. Cl.$^4$ .................. B01J 27/19; B01J 31/00; B01J 27/051; B01J 21/08

[52] U.S. Cl. ................... 502/211; 502/171; 502/220; 502/221; 502/242; 502/255

[58] Field of Search ............ 502/171, 220, 221, 242, 502/255, 211

[56] References Cited

U.S. PATENT DOCUMENTS

| | | | |
|---|---|---|---|
| Re. 29,771 | 9/1978 | Cull et al. | 502/263 X |
| 3,278,421 | 10/1966 | Gotsic | 208/216 R |
| 3,288,704 | 11/1966 | O'Hara et al. | 208/254 H |
| 3,677,971 | 7/1972 | White | 252/455 R |
| 3,826,736 | 7/1974 | Kittrell | 208/59 |
| 3,884,798 | 5/1975 | Hilfman | 502/242 X |
| 3,944,503 | 3/1976 | Suto et al. | 252/455 R |
| 4,169,040 | 9/1979 | Bea et al. | 208/59 |
| 4,176,089 | 11/1979 | Cull | 502/236 |
| 4,196,101 | 4/1980 | Wilson et al. | 502/221 |
| 4,233,183 | 11/1980 | Jnaba et al. | 502/255 X |
| 4,327,188 | 4/1982 | Endo et al. | 502/242 X |
| 4,482,642 | 11/1984 | Ettlinger et al. | 502/242 X |
| 4,552,642 | 11/1985 | Hettinger | 502/255 X |
| 4,593,014 | 6/1986 | Hallvin et al. | 502/242 |

FOREIGN PATENT DOCUMENTS 0002436  6/1978  Japan ..................... 502/242

OTHER PUBLICATIONS

Supports Effects Studied on Model Supported Catalysts, R. J. Gorte (1985).
J. Catalysis, 87, 292–304, Bachelier et al (1984).

*Primary Examiner*—Curtis R. Davis
*Assistant Examiner*—William G. Wright
*Attorney, Agent, or Firm*—K. K. Brandes

[57] ABSTRACT

A novel catalyst for recovering middle distillates comprising silica/titanium compound impregnated on an alumina and promoted with nickel and molybdenum.

9 Claims, No Drawings

HYDROCRACKING CATALYST FOR MIDDLE DISTILLATES

BACKGROUND OF THE INVENTION

This invention relates generally to hydrocracking. In particular it relates to the cracking of middle distillates. In another embodiment it relates to a catalyst composition. In particular it relates to the use of a catalyst composition for the production of middle distillates.

Strong continuing need and demand for middle distillate oil is being felt in the industry. Heavy distillate oil has been and remains a desirable source of middle distillate oil. However, heavy oils are, in large part, diverted to fuel oils because of the lack of an effective method for converting them to lower boiling products. These oils usually contain significant amounts of nitrogenous hydrocarbon impurities. Thus in addition to hydrocracking, their conversion involves nitrogen removal. Catalyst normally selected for converting middle distillates to gasoline produce large amounts of dry gases, butanes and gasoline when used with heavy distillate feedstocks. Catalysts known in the prior art when used to produced middle distillates either provide good conversion with poor selectivity or good selectivity with poor conversion.

The object of this invention is to provide an effective and improved process for producing middle distillates from heavy distillate oil. Another object of this invention is to provide a catalyst composition that will have good conversion and selectivity to middle distillates. Other objects will become clear from the description and examples herein.

SUMMARY OF THE INVENTION

According to the instant invention a silica/titania catalyst which has been impregnated onto alumina and then promoted with nickel and molybdenum has shown good conversion and good selectivity for middle distillates.

DETAILED DESCRIPTION OF THE INVENTION

The first step in the instant invention is to form a silicon/titanium solution. To prepare the silicon/titanium solution a silicon alkoxide and a titanium alkoxide are mixed with an organic diluent. The alkoxide constituent of the titanium alkoxide and of the silicon alkoxide can be any alkoxide constituent which contains from about 1 to about 20, preferably from about 1 to about 4 carbon atoms and which is soluble in the liquid reaction medium. Suitable alkoxides include n-butoxide, secondary butoxide, isobutoxide, isopropoxide, n-propoxide, ethoxide and methoxide. The methyl or ethyl esters (alkoxides) of silicon and the isopropyl or butyl esters (alkoxides) of titanium are preferred.

The organic diluent which is mixed with the titanium alkoxide and the silicon alkoxide can be any aromatic compound such as benzene, toluene, and xylene or paraffins such as hexane, heptane and cyclohexane; a halogenated hydrocarbon such as tetrachloroethylene; ether such as diethyl ether; ketones such as methyl/ethyl ketone, acetone, etc. Preferably the organic solvent which exhibits mutual solubility for the titanium and silicon alkoxides and for water are used as the diluent. More preferably the diluent is an alcohol, most preferably a C1-C4 alcohol, such as methanol, ethanol, normal and isopropanol, normal and isobutanol.

The molar ratio of silicon alkoxide to titanium alkoxide that are mixed together will depend upon the desired ratio of titanium alkoxide and silicon alkoxide in the final composition. Thus the molar ratio silicon alkoxide to titanium alkoxide may range from about 10:1 to about 0.05:1. Preferable molar ratio is 1:1. The organic diluent mixed with the alkoxides is added in a range from about 0 to about 90 volume percent based on the total mixture. The mixture is prepared at room temperature and atmospheric pressure.

The thus formed silicon and titanium solution is then mixed with a dried alumina and impregnated onto the alumina. Once the silicon/titanium solution has been completely absorbed onto the alumina the mixture is then treated with moist air to hydrolyse the silicon and titanium compounds. This process takes place over a period ranging from about 4 to about 24 hours with the contacting preferably taking place by bubbling the air through water and then through the impregnated bed of alumina.

After the hydrolysis of the silicon/titanium solution, the mixture is then dried in the pressure of some gas flowing at a rate sufficient to dry the bed in a reasonable length of time at a temperature ranging from about 100° to about 200° F.

The dried mixture, which may still contain some moieties which have not hydrolyzed, is then calcined. This is preferably done in the presence of an oxidizing gas so as to burn off the remaining unhydrolyzed material. However, care should be taken that the material being calcined does not "ignite", resulting in rapid oxidation and high temperature in some localized area of the bed of silica/titania alumina. This can be prevented by restricting the flow of oxidizing gas into the bed, and/or diluting the oxidizing gas with an inert gas, and/or raising the temperature of the bed slowly. For example, air may be diluted with nitrogen in a nitrogen:air ratio ranging from 0 to about 5. The calcining temperature can be increased at from about 0.1° to about 5° F. per minute. The final temperature can range from about 800° to about 1500° F. Alternatively, excessive temperatures can be avoided during this calcination by using extremely shallow beds of silica/titania alumina.

The thus prepared silica/titania on alumina compound is then promoted utilizing nickel and molybdenum oxide. A solution containing nickel, molybdenum, and possibly other elements is impregnated on the silica/titania/alumina product. This mixture is then calcined at a temperature ranging from about 500° to about 1500° F. for about 1 to about 20 hours.

Generally when promoting with nickel and molybdenum the nickel will be present in the amount of about 0.1 to about 5 weight percent based on the weight of the catalyst and the molybdenum will be present in an amount of about 1 to about 15 weight percent.

In one embodiment, the calcined catalyst composition of this invention is presulfided by the additional step of contacting the calcined catalyst composition with a suitable sulfur compound under such conditions as to at least partially convert the transition metal compounds contained in the calcined catalyst composition to sulfides. This can be accomplished by passing a sulfur-containing gas oil or a solution of COS or mercaptans or organic sulfides, e.g., in a hydrocarbon solvent, over the catalyst composition at an elevated temperature (e.g., at 300°-650° F.), generally in the presence of hydrogen gas. Or a gaseous mixture of hydrogen and hydrogen sulfide (e.g., at a volume ratio of about 10:1) can be passed over the catalyst composition at an elevated temperature, preferably 1-15 hours at about 400° F. and then 1-15 hours at about 700° F. This presulfiding step is particularly desirable when the catalyst composition of this invention is used for hydrotreating or hydrocracking of liquid hydrocarbon containing feed stream sulfur.

The thus formed catalyst is suitable for use in the recovery of middle distillates after presulfiding the catalyst.

One method of recovering middle distillates is to use a vacuum gas oil treatment. The vacuum gas oil treatment, which is utilized to recover distillates with a boiling point ranging from about 300° to about 700° F., generally takes place at conditions ranging from about 650° to about 900° F., at a pressure ranging from about 500 to about 3,000 psi, with a liquid hourly space velocity ranging from about 0.1 to about 5.

It is generally understood that in this novel catalyst the silica and titania materials provide the acidity for the catalyst where the alumina provides the surface area and pore distribution. Generally, this catalyst will have pore diameter ranging from about 50 to about 300 Å, with a pore volume ranging from about 0.3 to about 1.5 cc per gram and a surface area ranging from about 50 to about 300 m$^2$/g.

After use this catalyst can be regenerated by burning off the "coke" in an oxidizing atmosphere using conventional methods.

The following examples demonstrate the usefulness of this invention, but are not intended to limit the scope of the invention.

EXAMPLE I

This example illustrates the preparation of various promoted hydrocracking catalyst compositions.

Control Catalyst A was a silica/titania catalyst that was promoted with nickel and molybdenum. This catalyst was prepared as follows. First, 16.4 grams of NiCO$_3$, 51.0 grams of MoO$_3$ and 9.8 grams of 85 weight-% H$_3$PO$_4$ were mixed with about 80 ml of water. This mixture was stirred and heated under reflux conditions for about 4 hours. 168 grams of a clear, green solution were obtained. 1 gram of this solution contained 0.203 grams (0.0021 g-atoms) of Mo, 0.048 grams (0.0008 g-atoms) of Ni and 0.0219 grams (0.0007 g-atoms) of P.

The silica-titania support material of Catalyst A was prepared substantially in accordance with Preparation "A" described in U.S. Pat. No. 4,176,089, hereby incorporated by reference. A mixture of 72 cc of H$_2$O and 928 cc of isopropanol was placed in a 4-liter flask equipped with stirring bar, thermocouple, condenser and separatory funnel. This mixture was heated to 60°-65° C. A second mixture containing 104 grams of Si(OC$_2$H$_5$)$_4$, 170 grams of Ti(C$_4$H$_9$O)$_4$ and 500 cc of isopropanol was slowly added through the separatory funnel into the 4-liter flask. This addition of the silicon and titanium compounds required about 3 hours. The entire mixture in the 4-liter flask was heated for one more hour at about 65° C. and then filtered. The filter cake was dried under a 250 watt heat lamp for about 3 days, and then calcined at about 1000° F. for about 16 hours. The powdery material was compacted to ⅛" pills, which were crushed into 10/20 mesh granules. The surface area of the support material was 266 m$^2$/g (determined in accordance with the BET/N$_2$ method, ASTM D3037).

9.35 grams of the above-described Ni/Mo/P solution was diluted with water to a total volume of 9.7 cc. This diluted solution was added to 15.64 grams of the above-described silica/titania material under vacuum conditions. The Ni/Mo-impregnated SiO$_2$/TiO$_2$ catalyst composition was dried under a 250 watt heat lamp for several hours and calcined for 2 hours at 400° F., for 1 hour at 500° F. and for 3 hours at 800° F. in a stream of air. The calcined Catalyst A contained 3.0 weight-% Ni, 12.7 weight-% Mo and 1.0 weight-% P catalyst was presulfided using H$_2$/H$_2$S.

Catalyst A was presulfided before use as follows. A heated tube reactor was filled with a 2½ inch high bottom layer of Alundum (α-alumina having a surface area of less than 1 m$^2$/g), an 11 inch high middle layer of a 70 cc mixture containing 12.5 cc of the catalyst and the balance 36 grit Alundum, and a 5 inch top layer of Alundum. The reactor was purged with nitrogen and the catalyst was heated for one hour in a hydrogen stream to about 400° F., the catalyst was exposed to a mixture of nitrogen (10 l/hr), hydrogen (10 l/hr) and hydrogen sulfide (1.4 l/hr) for about 14 hours. The catalyst was then heated for about one hour in the mixture of hydrogen and hydrogen sulfide to a temperature of about 700° F. for about 14 hours while the catalyst continued to be exposed to the mixture of hydrogen and hydrogen sulfide. The catalyst was then allowed to cool to ambient temperature conditions in the mixture of hydrogen and hydrogen sulfide and was finally purged with nitrogen.

Control Catalyst B was a Ni/Mo/P mixture of alumina and coprecipitated SiO$_2$/TiO$_2$ 40 grams of alumina (surface area: 293 m$^2$/g; pore volume: 0.78 cc/g; dried for 16 hours at 350° C.), 7.7 grams of dried silica/titania support material (described above; used for Catalyst A) and some water were mixed with mortar and pestle. Dilute nitric acid was dropwise added to the above wet mixture of Al$_2$O$_3$ and SiO$_2$/TiO$_2$ until a pH of 3.0 was attained. Grinding with mortar and pestle was continued about 2 hours. Then the mixture was partially dried with a hot air gun while being continuously stirred and ground. The thick paste of the mixture of alumina and silica/titania was dried under a 250 watt heat lamp for several days. The dry mixture was calcined at 1000° F. for about 6 hours under a stream of air.

The calcined mixture of alumina and SiO$_2$/TiO$_2$ was impregnated under vacuum with the Ni/Mo-containing impregnating solution, dried, calcined and presulfided essentially in accordance with the procedure described for Catalyst A. Calcined Catalyst B contained 1.0 weight-% P, 3.1 weight-% Ni and 13 weight-% Mo.

Invention Catalyst C$_1$ was prepared as follows. 9.4 grams of Si(C$_2$H$_5$O)$_4$ and 14.2 grams of Ti(C$_4$H$_9$O)$_4$ were mixed and then poured over 40.0 grams of alumina powder (dried at 300° C. for 16 hours). The mixture was thoroughly stirred in a sealed flask. A stream of air (4.0 scf/hr) was bubbled through water and then passed over the above Si/Ti-impregnated alumina material for 16 hours. The Si/Ti-impregnated alumina was calcined in a 1:1 air/nitrogen gas stream for 2 hours at 400° F., 1 hour at 500° F., 3 hours at 800° F. and 1 hour at 1000° F. 25.6 grams of a Ni/Mo impregnating solution, which was essentially the same as the one described in the procedure for making Catalyst A but containing 0.267 g Mo, 0.064 g Ni, 0.021 g P per gram of solution, was diluted with water to a total of 24 cc. The calcined Si/Ti-impregnated alumina was impregnated with this impregnating solution, dried, calcined and presulfided in accordance with the procedure described for Catalyst A. Calcined Catalyst C contained 2.1 weight-% Si, 3.4 weight-% Ti, 2.7 weight-% Ni, 11.4 weight-% Mo, 0.9 weight-% P.

Invention Catalyst $C_2$ was prepared substantially in accordance with the procedure described for Catalyst $C_1$, with the exception that 21.9 grams of Ti($C_4H_9O$)$_4$ were used (in lieu of 14.2 g). In addition, the calcined catalyst $C_2$ was presulfided by heating at 204° F. in a nitrogen stream that was saturated with 2-mercaptoethanol vapor. Catalyst $C_2$ contained 2.0 weight-% Si, 5.1 weight-% Ti, 2.6 weight-% Ni, 11.0 weight-% Mo and 0.9 weight-% P.

Invention Catalyst $C_3$ was substantially the same as Catalyst $C_1$ except that it contained more Si and Ti. Calcined Catalyst $C_3$ comprised 4.3 weight-% Si, 7.6 weight-% Ti, 2.4 weight-% Ni, 9.9 weight-% Mo and 0.8 weight-% P.

EXAMPLE II

This example illustrates processes for hydrocracking of a heavy hydrocarbon feedback. The feed was a vacuum gas oil having an API 60 gravity of 24.8 containing 0.5 weight-% S and 0.08 weight-% N, and boiling at atmospheric pressure conditions in the range of 650°–1100° F. The oil feed and hydrogen gas (3500 scf $H_2$ per barrel oil) were passed through a ¾" I.D., 22" long reactor filled with a mixture of 25 cc of one of the catalysts described in Example I and 45 cc of 20/40 mesh inert Alundum alumina (surface area: less than 1 $m^2/g$). The liquid hourly space velocity of the feed was about 0.5 cc/cc hour the reactor temperature ranged from about 700° to about 800° C.; the reaction pressure was maintained at about 1400 psig. Reactor effluent streams were cooled, analyzed and fractionated under atmospheric pressure conditions. Pertinent operating parameters and results are summarized in Table I.

TABLE I

| Run | Temp (°F.) | Catalyst | API$^{60}$ of Product | Product Fractions[1] IBP–330F | 330–650F | % Conversion of Feed | % Conversion to 330–650F |
|---|---|---|---|---|---|---|---|
| 1 (Control) | 725 | A | 26.9 | 1.65 | 12.92 | 5.33 | 3.50 |
| 2 (Control) | 725 | B | 33.7 | 8.12 | 29.49 | 30.60 | 21.57 |
| 3 (Invention) | 725 | $C_1$ | 32.4 | 5.02 | 25.49 | 22.80 | 17.22 |
| 4 (Invention) | 725 | $C_2$ | — | 10.37 | 36.51 | 40.4 | 28.77 |
| 5 (Invention) | 725 | $C_3$ | — | 12.5 | 34.9 | 41.4 | 27.5 |
| 6 (Control) | 750 | A | 27.8 | 2.80 | 14.68 | 8.54 | 5.44 |
| 7 (Control) | 750 | B | 34.9 | 9.87 | 34.57 | 38.21 | 27.23 |
| 8 (Invention) | 750 | $C_1$ | 36.1 | 11.3 | 37.3 | 42.9 | 30.4 |
| 9 (Invention) | 750 | $C_2$ | — | 13.76 | 38.45 | 46.39 | 30.96 |
| 10 (Invention) | 750 | $C_3$ | — | 15.4 | 40.4 | 50.7 | 33.6 |
| 11 (Control) | 775 | A | 29.7 | 4.95 | 24.36 | 21.66 | 16.17 |
| 12 (Control) | 775 | B | 37.4 | 15.30 | 41.46 | 51.90 | 34.88 |
| 13 (Invention) | 775 | $C_1$ | 39.8 | 17.81 | 44.62 | 58.26 | 38.47 |
| 14 (Invention) | 775 | $C_2$ | — | 19.80 | 46.04 | 61.67 | 39.46 |
| 15 (Invention) | 775 | $C_3$ | — | 23.9 | 46.7 | 67.1 | 40.6 |
| 16 (Control) | 800 | A | 33.2 | 12.2 | 34.9 | 41.3 | 27.8 |
| 17 (Control) | 800 | B | 39.8 | 20.38 | 50.24 | 67.32 | 44.65 |
| 18 (Invention) | 800 | $C_1$ | 41.9 | 25.11 | 50.78 | 73.21 | 45.32 |
| 19 (Invention) | 800 | $C_2$ | — | 28.18 | 50.92 | 76.56 | 44.94 |
| 20 (Invention) | 800 | $C_3$ | — | 30.8 | 50.8 | 79.6 | 45.2 |

[1]simulated distillation

Data in Table I show that hydrocracking runs employing invention Catalysts $C_1$, $C_2$ and $C_3$ produced more of the valuable 330–650F. boiling product, especially at the commercially more feasible temperature range of 750°–800° F. Also, the total conversion of the feed and the conversion of the feed to the 330–650F. fraction was higher in runs employing invention catalysts $C_1$, $C_2$ and $C_3$, especially at 750°–800° F.

I claim:

1. A catalyst composition comprising nickel, molybdenum, and phosphorus impregnated on a support consisting of silica/titania on alumina wherein the molar ratio of silica to titania ranges from about 10:1 to about 0.05:1, said nickel is present in the composition in an amount ranging from about 0.1 to about 5 weight percent based on the weight of said catalyst composition, and said molybdenum is present in the composition in an amount ranging from about 1 to about 15 weight percent based on the weight of said catalyst composition.

2. A catalyst composition according to claim 1 wherein said phosphorus is present in the composition in an amount of about 1 weight percent based on the weight of said catalyst composition.

3. A catalyst composition according to claim 1 wherein said catalyst composition is sulfided.

4. A catalyst composition consisting essentially of the catalyst composition of claim 1.

5. A process for producing a catalyst composition comprising:
impregnating onto a dried alumina a solution containing silicon and titanium to form a silicon/titanium-impregnated alumina material,
hydrolyzing said silicon/titanium-impregnated alumina material to form a hydrolyzed silica/titania on alumina composition,
drying and thereafter calcining said hydrolyzed silica/titania on alumina composition to form a calcined composition,
impregnating said calcined composition with a solution of nickel, molybdenum and phosphorus to form a nickel/molybdenum/phosphorus on silica/titania on alumina composition, and
calcining said nickel/molybdenum/phosphorus on silica/titania on alumina composition to form said catalyst composition.

6. A process in accordance with claim 5 wherein said solution containing silicon and titanium is a solution containing a silicon alkoxide and a titanium alkoxide, and said solution of nickel, molybdenum and phosphorus is an aqueous solution of $NiCO_3$, $MoO_3$ and $H_3PO_4$.

7. A process in accordance with claim 6, wherein said silicon alkoxide is $Si(C_2H_5O)_4$ and said titanium alkoxide is $Ti(C_4H_9O)_4$.

8. A process for producing a presulfided catalyst composition comprising:
(a) mixing a silicon alkoxide, a titanium alkoxide and about 0 to about 90 volume percent, based on the total mixture, of organic diluent to form a silicon and titanium solution;
(b) impregnating a dried alumina with said silicon and titanium solution to form a silicon/titanium-impregnated alumina material;
(c) hydrolyzing said silicon/titanium-impregnating alumina material to form a hydrolyzed silica/titania on silica composition;
(d) drying said hydrolyzed silica/titania on alumina composition to form a dried composition;
(e) calcining said dried composition to form a calcined composition;
(f) impregnating said calcined composition with an impregnating solution of nickel, molybdenum and phophorus in a diluent to form a nickel/molybdenum/phosphorus on silica/titania on alumina composition;
(g) calcining said nickel/molybdenum/phosphorus on silica/titania on alumina composition to form a calcined composition; and
(h) presulfiding said calcined composition to form said presulfided catalyst composition.

9. A process according to claim 8 wherein
said silicon alkoxide is $Si(C_2H_5O)_4$,
said titanium alkoxide is $Ti(C_2H_9O)_4$,
said nickel in said impregnating solution is provided by $NiCO_3$,
said molybdenum in said impregnating solution is provided by $MoO_3$,
said phosphorus in said impregnating solution is provided by $H_3PO_4$, and
said diluent of said impregnating solution is water.

* * * * *